(12) United States Patent
Zhao et al.

(10) Patent No.: US 12,741,690 B2
(45) Date of Patent: Sep. 22, 2026

(54) STEERING SYSTEM AND VEHICLE

(71) Applicant: BYD COMPANY LIMITED, Shenzhen (CN)

(72) Inventors: Min Zhao, Shenzhen (CN); Jun Su, Shenzhen (CN); Qicheng Deng, Shenzhen (CN); Chong Sun, Shenzhen (CN); Qi Huang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 657 days.

(21) Appl. No.: 18/200,250

(22) Filed: May 22, 2023

(65) Prior Publication Data

US 2023/0294755 A1 Sep. 21, 2023

Related U.S. Application Data

(63) Continuation of application No. PCT/CN2021/132829, filed on Nov. 24, 2021.

(30) Foreign Application Priority Data

Nov. 27, 2020 (CN) ........................ 202011361233.6

(51) Int. Cl.
*B62D 5/04* (2006.01)
*B62D 5/00* (2006.01)

(52) U.S. Cl.
CPC ........... *B62D 5/0421* (2013.01); *B62D 5/006* (2013.01); *B62D 5/0469* (2013.01)

(58) Field of Classification Search
CPC ..... B62D 5/0421; B62D 5/006; B62D 5/0469
(Continued)

(56) References Cited

U.S. PATENT DOCUMENTS 3,282,366 A * 11/1966 Sprague .................. B60K 5/02 180/240
10,442,459 B2 * 10/2019 Siskoy .................. B62D 5/006
(Continued)

FOREIGN PATENT DOCUMENTS

CN 102574545 A 7/2012
CN 204077788 U 1/2015
(Continued)

OTHER PUBLICATIONS

International Search Report and Written Opinion for Application No. PCT/CN2021/132829, mailed on Mar. 2, 2022, 11 pages.
(Continued)

*Primary Examiner* — Valentin Neacsu
*Assistant Examiner* — Mohamed M Medani
(74) *Attorney, Agent, or Firm* — Sheppard Mullin Richter & Hampton LLP

(57) ABSTRACT

A steering system includes: a steering gear body, where the steering gear body includes a steering gear input shaft and a gear shaft; a decoupling mechanism, where the decoupling mechanism is configured to decouple the steering gear input shaft from the gear shaft or couple the steering gear input shaft to the gear shaft; and a limiting mechanism, where the limiting mechanism is configured to limit a range of a steering angle of the steering gear input shaft, in response to that the steering gear input shaft is decoupled from the gear shaft or that the steering gear input shaft is coupled to the gear shaft.

20 Claims, 8 Drawing Sheets

(58) Field of Classification Search
USPC .......................................................... 180/444
See application file for complete search history.

(56) References Cited

U.S. PATENT DOCUMENTS

| | | | | |
|---|---|---|---|---|
| 2015/0090519 | A1* | 4/2015 | D'Amato | B62D 5/003 180/446 |
| 2015/0285317 | A1* | 10/2015 | Lannutti | F02B 63/00 192/41 R |
| 2019/0276070 | A1 | 9/2019 | Klinger | |

FOREIGN PATENT DOCUMENTS

| | | | | | |
|---|---|---|---|---|---|
| CN | 104627232 | A | | 5/2015 | |
| CN | 205401484 | U | | 7/2016 | |
| CN | 106741139 | A | | 5/2017 | |
| CN | 207875620 | U | | 9/2018 | |
| CN | 110155154 | A | | 8/2019 | |
| CN | 110155156 | A | | 8/2019 | |
| CN | 110217236 | A | | 9/2019 | |
| CN | 110550100 | A | | 12/2019 | |
| CN | 110949501 | A | | 4/2020 | |
| CN | 111114620 | A | | 5/2020 | |
| CN | 210971246 | U | | 7/2020 | |
| CN | 211336155 | U | | 8/2020 | |
| CN | 111727147 | A | | 9/2020 | |
| CN | 211519637 | U | | 9/2020 | |
| CN | 111845923 | A | | 10/2020 | |
| CN | 211869497 | U | | 11/2020 | |
| CN | 211869498 | U | | 11/2020 | |
| CN | 112572596 | A | * | 3/2021 | B62D 1/22 |
| CN | 112706827 | A | | 4/2021 | |
| CN | 112706828 | A | | 4/2021 | |
| CN | 112706830 | A | | 4/2021 | |
| DE | 102018217506 | A1 | | 4/2020 | |
| EP | 3508397 | A1 | * | 7/2019 | G09B 9/02 |
| GB | 2567184 | A | * | 4/2019 | B62D 1/16 |
| JP | 2000203435 | A | | 7/2000 | |
| JP | 2001322443 | A | | 11/2001 | |
| JP | 2004-009862 | A | | 1/2004 | |
| JP | 2004345600 | A | | 12/2004 | |
| JP | 2009090939 | A | | 4/2009 | |
| JP | 2011031754 | A | * | 2/2011 | |
| JP | 2014-005885 | A | | 1/2014 | |
| KR | 20180020710 | A | | 2/2018 | |
| KR | 10-2019-0106786 | A | | 9/2019 | |

OTHER PUBLICATIONS

First Office Action and Search Report dated Nov. 15, 2022, issued in Chinese Patent Application No. 202011361233.6, with English machine translation (14 pages).
Second Office Action dated May 25, 2023, issued in Chinese Patent Application No. 202011361233.6, English translation only (9 pages).
Extended European Search Report dated Apr. 9, 2024, issued in European Patent Application No. 21897033.3 (8 pages).
Notice of Reasons for Refusal dated May 28, 2024, issued in Japanese Patent Application No. 2023-532568, with English machine translation (8 pages).
Notice of Reasons for Refusal dated Oct. 29, 2024, issued in Japanese Patent Application No. 2023-532568, with English machine translation (9 pages).
Request for the Submission of an Opinion dated Aug. 19, 2025, issued in Korean Patent Application No. 10-2023-7018453, with English machine translation (18 pages).
Office Action dated Jan. 9, 2025, issued in Columbian Patent Application No. NC2023/0008119, with English machine translation (14 pages).

* cited by examiner 402
404
401

STEERING SYSTEM AND VEHICLE

CROSS-REFERENCE TO RELATED APPLICATIONS

This application is a Continuation Application of International Patent Application No. PCT/CN2021/132829, filed on Nov. 24, 2021, which is based on and claims priority to and benefits of Chinese Patent Application No. 202011361233.6, filed on Nov. 27, 2020 and entitled "STEERING SYSTEM AND VEHICLE". The entire content of all of the above-referenced applications is incorporated herein by reference.

FIELD

The present disclosure relates to the technical field of vehicles, and particularly, to a steering system and a vehicle.

BACKGROUND

With the improvement of living standards, on-board entertainment devices increasingly become an important means to enhance the competitiveness of vehicle models. Currently, the available entertainment applications for passengers on the market are often developed based on on-board Pads. The Pads have relatively fixed spatial positions and inflexible operation and interaction means. As a result, considerable inconvenience is caused during gaming or the like.

In recent years, there have been developed on-board entertainment applications based on the interactions with the steering wheel, which require an integration with the vehicle steering system. The steering system still has a complete mechanical connection. During the game entertainment, when a driver turns the steering wheel, tires still rotate, which will inevitably lead to increased tire wear and pose safety hazards.

SUMMARY

In order to overcome the above technical problems of the related art, the present disclosure provides a steering system. The steering system keeps wheels from turning when a vehicle is in a game mode, which effectively prevents the steering wheel wear.

In order to achieve the above objects, according to a first aspect of the present disclosure, a steering system is provided. The system includes:

- a steering gear body, including a steering gear input shaft and a gear shaft;
- a decoupling mechanism, configured to decouple the steering gear input shaft from the gear shaft or couple the steering gear input shaft to the gear shaft; and
- a limiting mechanism, where the limiting mechanism is configured to limit a range of a steering angle of the steering gear input shaft in response to that the steering gear input shaft is decoupled from the gear shaft or that the steering gear input shaft is coupled to the gear shaft.

In some embodiments, the steering gear input shaft is disposed coaxially with the gear shaft.

The decoupling mechanism includes a decoupling slide sleeve and a decoupling shaft. The decoupling slide sleeve is sleeved on one of the steering gear input shaft and the gear shaft. The decoupling shaft is disposed on the other one of the steering gear input shaft and the gear shaft. The decoupling slide sleeve is configured to translate in an axial direction of the steering gear input shaft and an axial direction of the gear shaft to be engaged with or disengaged from the decoupling shaft and to couple the steering gear input shaft to the gear shaft or decouple the steering gear input shaft from the gear shaft.

In some embodiments, the steering gear input shaft includes a hollow structure. An upper section of the gear shaft extends into the hollow structure.

The decoupling slide sleeve is splined to a lower section of the steering gear input shaft. A lower section of the decoupling shaft is splined to the upper section of the gear shaft and is locked to the upper section of the gear shaft through a first locking nut. The decoupling slide sleeve includes a first claw teeth. The decoupling shaft includes a second claw teeth. The decoupling slide sleeve is configured to translate in an axial direction of the steering gear input shaft and an axial direction of the gear shaft to cause the first claw teeth to be engaged with or disengaged from the second claw teeth and to couple the steering gear input shaft to the gear shaft or decouple the steering gear input shaft from the gear shaft.

In some embodiments, the upper section of the gear shaft is disposed in the hollow structure of the lower section of the steering gear input shaft through a first needle bearing.

In some embodiments, the steering gear body further includes a housing. The lower section of the steering gear input shaft and the gear shaft are rotatably mounted in the housing.

In some embodiments, the decoupling mechanism further includes a drive transmission mechanism configured to drive the decoupling slide sleeve to translate in the axial direction of the steering gear input shaft and the axial direction of the gear shaft to be engaged with/disengaged from the decoupling shaft.

In some embodiments, the drive transmission mechanism includes:

- a first power element, configured to provide a driving force; and
- a transmission reversing component, configured to convert a rotary driving force outputted by the first power element into axial translation of the decoupling slide sleeve.

In some embodiments, the transmission reversing component includes a lead screw connected with an output shaft of the first power element and a shifting fork threaded with the lead screw. The decoupling slide sleeve is embedded at a shifting fork end of the shifting fork to cause the decoupling slide sleeve to rotate with the steering gear input shaft and to translate in the axial direction of the steering gear input shaft.

In some embodiments, a decoupling bearing is coaxially disposed on an outer side of the decoupling slide sleeve. A driving block is connected to an outer ring of the decoupling bearing. The driving block is disposed on the shifting fork. The transmission reversing component is configured to drive the decoupling slide sleeve to axially translate.

In some embodiments, a first side of an inner ring of the decoupling bearing abuts against a shaft shoulder of the decoupling slide sleeve, a second side of the inner ring of the decoupling bearing is limited though a third retainer ring, a first side of the outer ring of the decoupling bearing abuts against a shaft shoulder of the driving block, and a second side of the outer ring of the decoupling bearing is limited through a second retainer ring In some embodiments, the first power element is fixed on the housing; the housing comprises an opening; the shifting fork is connected to the decoupling slide sleeve through the opening and axially translational at the opening.

In some embodiments, the steering system further includes a feeling feedback mechanism, where the feeling feedback mechanism is configured to apply a feedback torque to the steering gear input shaft during decoupling of the steering gear input shaft from the gear shaft.

In some embodiments, the feeling feedback mechanism includes:

- a second power element, configured to provide a first driving force; and
- a first transmission mechanism, configured to transmit the first driving force to the steering gear input shaft to apply a reversed feedback torque to the steering gear input shaft.

In some embodiments, the transmission mechanism includes a driving pulley connected with an output shaft of the second power element for synchronous rotation. A driven pulley is connected with the driving pulley through a belt. The driven pulley is connected with the steering gear input shaft through a driven pulley bearing and the driven pulley is configured to engage with or disengage from the decoupling slide sleeve.

In some embodiments, a belt retaining ring is disposed on one side of the driven pulley close to the decoupling slide sleeve.

In some embodiments, a first side of an outer ring of the driven pulley bearing abuts against a shaft shoulder of the driven pulley, a second side of the outer ring of the driven pulley bearing is limited by a fourth retainer ring, a first side of an inner ring of the driven pulley bearing abuts against a shaft shoulder of the steering gear input shaft, and a second side of the inner ring of the driven pulley bearing is limited by a second snap ring.

In some embodiments, the second power element is fixed to the housing through a support.

In some embodiments, the limiting mechanism includes a limiting disc and a limiting guide rail sleeved on the steering gear input shaft. The limiting disc is configured to rotate with the steering gear input shaft, the limiting disc includes a spiral groove and a limiting block disposed on the limiting disc. The limiting guide rail is fixed to the housing, a limiting slider is disposed in the limiting guide rail, and the limiting slider includes a guide pin inserted into the spiral groove and a limiting boss matching the limiting block.

In some embodiments, the limiting mechanism includes a first limiting pin disposed in the housing and a second limiting pin disposed on the decoupling slide sleeve, and the second limiting pin abuts against the first limiting pin to stop the steering gear input shaft when the steering gear input shaft rotates to a limit position.

In some embodiments, the steering system further includes a state detection mechanism configured to detect a decoupling state or a coupling state of the gear shaft and the steering gear input shaft.

In some embodiments, the state detection mechanism includes a Hall sensor and magnetic steel. The Hall sensor is disposed on the housing, a press-fit steel sleeve is disposed on the shifting fork, and the magnetic steel is disposed in a gap between the press-fit steel sleeve and the shifting fork.

Based on the steering system provided in the first aspect of the present disclosure, a second aspect of the present disclosure provides a vehicle. The vehicle includes the steering system according to the first aspect of the present disclosure.

Compared with the related art, the present disclosure has the following beneficial effects by adopting the above technical solution.

In the steering system of the present disclosure, the steering gear input shaft is decoupled from or coupled to the gear shaft through the decoupling mechanism. When the steering gear input shaft is coupled to the gear shaft, a vehicle enters a normal driving mode. During the rotation of the steering wheel, the steering gear input shaft may be driven to rotate, and the gear shaft is driven to rotate together through the decoupling mechanism. A user may drive a wheel to turn by operating the steering wheel to rotate. When the steering gear input shaft is decoupled from the gear shaft, the vehicle enters a game mode. When the steering wheel rotates, the steering gear input shaft is driven to rotate, but the gear shaft is not driven into rotation by the steering gear input shaft due to being decoupled from the steering gear input shaft.

The above description is only an overview of the technical solution of the present disclosure. In order to have a clearer understanding of the technical means of the present disclosure, which can be implemented in accordance with the contents of the specification, and in order to make the above and other purposes, characteristics and advantages of the present disclosure more clearly understood, the following are some embodiments of the present disclosure.

BRIEF DESCRIPTION OF THE DRAWINGS

The accompanying drawings provide further understanding of the present disclosure and constitute a part of the present disclosure. The accompanying drawings and the implementations below are used together for explaining the present disclosure rather than limiting the present disclosure.

The accompanying drawings are as following.

DESCRIPTION OF REFERENCE NUMERALS

Figure 1:
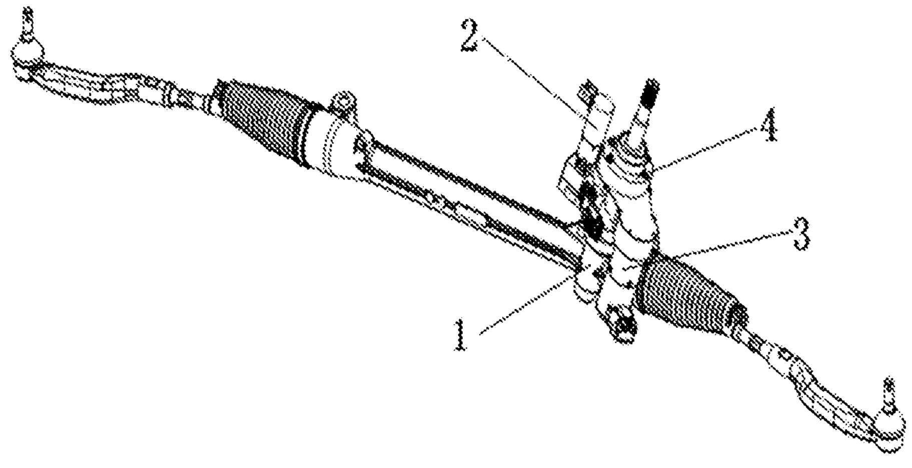
FIG. 1 is a schematic structural diagram of a steering system according to the present disclosure.
Figure 2:
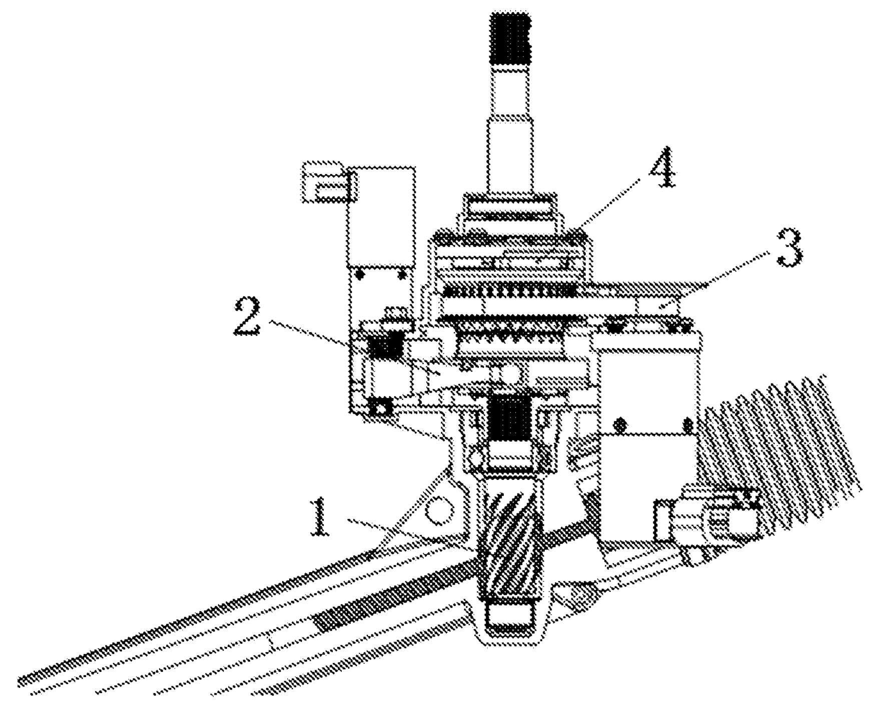
FIG. 2 is a cross-sectional view of a steering system according to the present disclosure.
Figure 3:
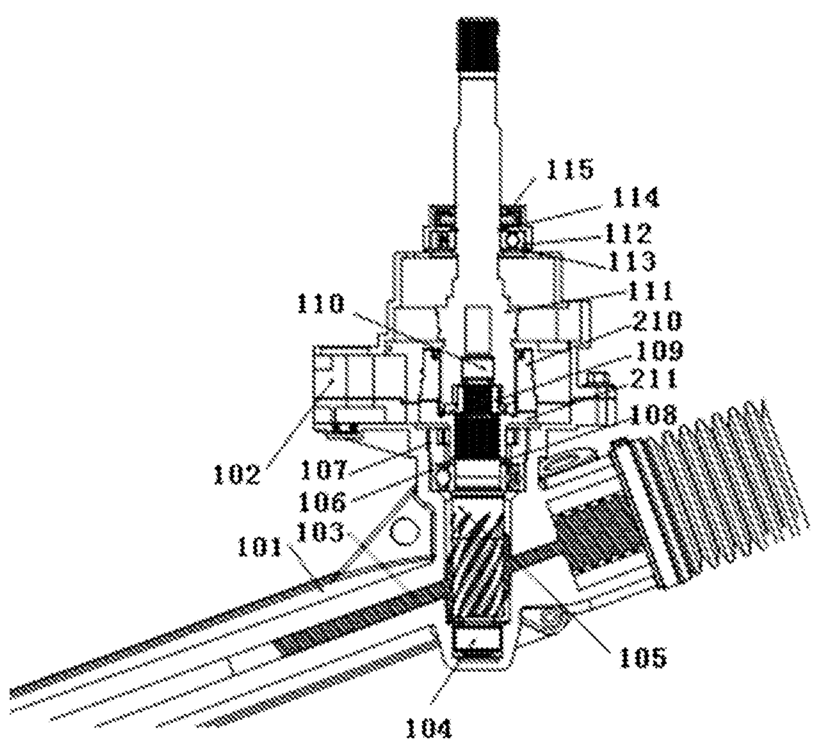
FIG. 3 is a cross-sectional view of a steering gear body according to the present disclosure.
Figure 4:
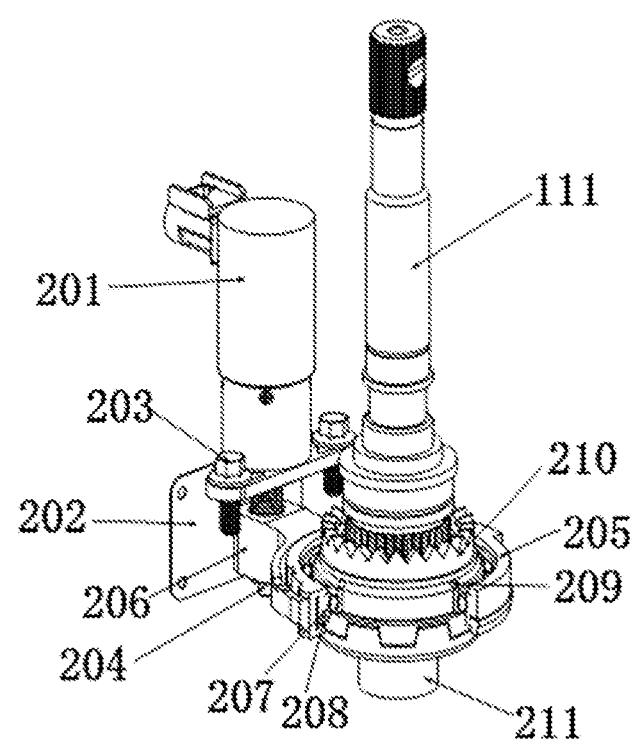
FIG. 4 is a schematic structural diagram of a decoupling mechanism in a coupling state.
Figure 5:
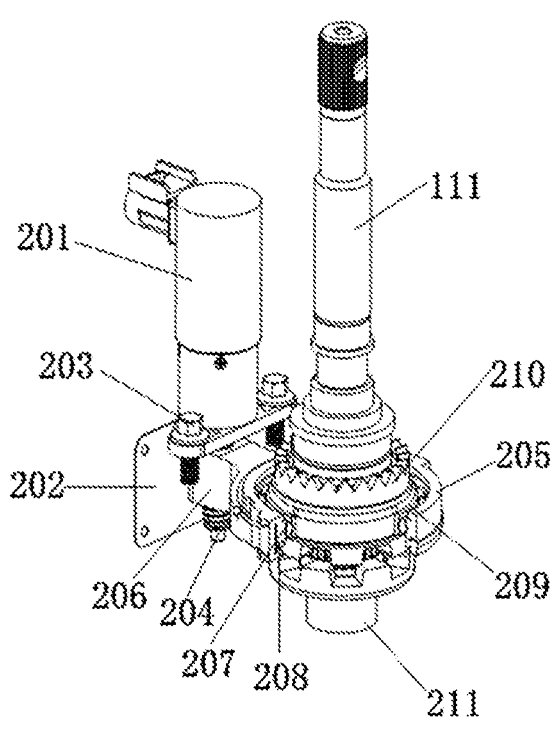
FIG. 5 is a schematic structural diagram of a decoupling mechanism in a decoupling state.
Figure 6:
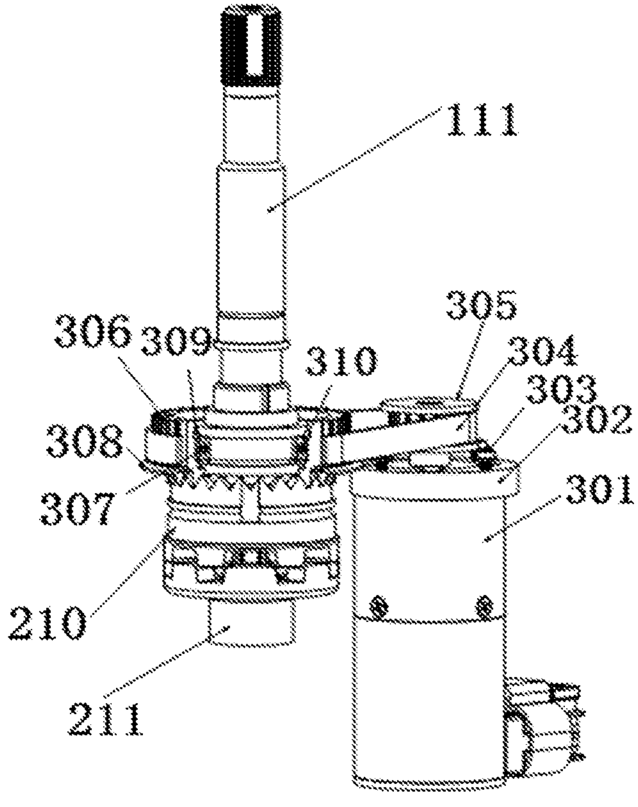
FIG. 6 is a schematic structural diagram of a feeling feedback mechanism according to the present disclosure.

- 1: Steering gear body; 101: Lower housing; 102: Upper housing; 103: Rack; 104: Second needle bearing; 105: Gear shaft; 106: First bearing; 107: Second locking nut; 108: Third locking nut; 109: First locking nut; 110: First needle bearing; 111: Steering gear input shaft; 112: Second bearing; 113: First retainer ring; 114: First snap ring; 115: Oil seal;
- 2: Decoupling mechanism; 201: First power element; 202: Sealing end cover; 203: First bolt; 204: Lead screw; 205: Driving block; 206: shifting fork; 207: Decoupling bearing; 208: Second retainer ring; 209: Third retainer ring; 210: Decoupling slide sleeve; 211: Decoupling shaft;
- 3: Feeling feedback mechanism; 301: Second power element; 302: Support; 303: First screw; 304: Belt; 305: Driving pulley; 306: Driven pulley; 307: Driven pulley bearing; 308: Belt retaining ring; 309: Fourth retainer ring; 310: Second snap ring;
- 4: Limiting mechanism; 401: Limiting disc; 402: Limiting guide rail; 403: Second screw; 404: Limiting slider; 405: First limiting pin; 406: Second limiting pin; 407: Second bolt;
- 501: Press-fit steel sleeve; 502: Magnetic steel; and 503: Hall sensor.

DETAILED DESCRIPTION

In order to make the objects, technical solutions, and advantages of the embodiments of the present disclosure clearer, the technical solutions in the embodiments of the present disclosure will be clearly and comprehensively described with reference to the accompanying drawings in the embodiments of the present disclosure. The following embodiments are used to illustrate the present application, but are not to limit the scope of the present application.

In the description of the present disclosure, it should be understood that In the description of the present disclosure, it should be understood that orientation or position relationships indicated by the terms such as "up", "down", "front", "back", "left", "right", "vertical", "inside", "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure.

An automobile steering system is configured to achieve the driving connection between a steering wheel and tires. When a user rotates the steering wheel, the tires can be driven to deflect by using the automobile steering system, thereby controlling a traveling direction of an automobile.

As shown in FIG. 1 to FIG. 8, the present disclosure provides a steering system, including a steering gear body 1 and a decoupling mechanism 2. The steering gear body 1 includes a steering gear input shaft 111 and a gear shaft 105. The decoupling mechanism 2 is configured to decouple the steering gear input shaft 111 from the gear shaft 105 or couple the steering gear input shaft to the gear shaft.

The steering gear input shaft 111 is decoupled from or coupled to the gear shaft 105 through the decoupling mechanism 2. When the steering gear input shaft 111 and the gear shaft 105 are coupled, a vehicle enters a normal driving mode. During the rotation of the steering wheel, the steering gear input shaft 111 may be driven to rotate, and the gear shaft 105 is driven to rotate together through the decoupling mechanism 2. A user may drive a wheel or a tire to turn by operating the steering wheel to rotate. When the steering gear input shaft 111 and the gear shaft 105 are decoupled, the vehicle enters a game mode. When the steering wheel rotates, the steering gear input shaft 111 is driven to rotate, but the gear shaft 105 is not driven into rotation by the steering gear input shaft 111 due to being decoupled from the steering gear input shaft 111. As a result, a turning torque of the steering wheel is not transmitted to the wheel to drive the wheel to turn, thereby reducing the wheel wear.

Multiple structures of the decoupling mechanism 2 may be provided. One embodiment of the decoupling mechanism 2 is given below in the present disclosure. Certainly, the structure of the decoupling mechanism 2 is not limited thereto.

In an embodiment, the steering gear input shaft 111 is arranged/disposed coaxially with the gear shaft 105. The decoupling mechanism 2 includes a decoupling slide sleeve 210 and a decoupling shaft 211. The decoupling slide sleeve 210 is sleeved on one of the steering gear input shaft 111 and the gear shaft 105. The decoupling shaft 211 is arranged/disposed on the other one of the steering gear input shaft 111 and the gear shaft 105. The decoupling slide sleeve 210 is configured to translate in an axial direction of the steering gear input shaft 111 and an axial direction of the gear shaft 105 to be engaged with/disengaged from the decoupling shaft 211 and to couple the steering gear input shaft 111 to the gear shaft 105 or decouple the steering gear input shaft from the gear shaft.

When the steering gear input shaft 111 is coupled to the gear shaft 105 by using the decoupling mechanism 2, the steering gear input shaft 111 needs to be aligned with the gear shaft 105, to realize smooth coupling of the steering gear input shaft 111 and the gear shaft 105.

In some embodiments of the present disclosure, the steering gear input shaft 111 includes a hollow structure. An upper section of the gear shaft 105 is extended into the hollow structure, to ensure that the steering gear input shaft 111 is coaxial with the gear shaft 105. In some embodiments, the upper section of the gear shaft 105 is arranged/disposed in the hollow structure of the lower section of the steering gear input shaft 111 through a first needle bearing 110.

The decoupling slide sleeve 210 is splined to a lower section of the steering gear input shaft 111. A lower section of the decoupling shaft 211 is splined to the upper section of the gear shaft 105 and is locked to the upper section of the gear shaft 105 through a first locking nut 109. The decoupling slide sleeve 210 includes first claw teeth. The decoupling shaft 211 includes second claw teeth. The decoupling slide sleeve 210 is driven to axially translate along the steering gear input shaft 111 and the gear shaft 105 to engage the first claw teeth and the second claw teeth and to couple the steering gear input shaft 111 and the gear shaft 105, or to disengage the first claw teeth from the second claw teeth to decouple the steering gear input shaft 111 from the gear shaft 105.

The lower section of the decoupling shaft 211 is mounted to the gear shaft 105 through the splines. The first locking nut 109 is configured to press the decoupling shaft 211 onto the gear shaft 105 to position the lower section of the decoupling shaft 211. The decoupling slide sleeve 210 is mounted to the lower section of the steering gear input shaft 111 through the splines. First claw teeth are arranged/disposed on one side of the decoupling slide sleeve 210 close to the decoupling shaft 211. Second claw teeth adapted to the first claw teeth are arranged/disposed on the decoupling shaft 211.

When the decoupling slide sleeve 210 is axially translated along the steering gear input shaft 111 and the gear shaft 105 until the first claw teeth are engaged with the second claw teeth, the steering gear input shaft 111 is coupled with the gear shaft 105 and the vehicle enters the normal driving mode. When the steering wheel is turned, the steering gear input shaft 111 is driven to rotate, and the gear shaft 105 is driven to rotate together with the decoupling mechanism 2. The user can drive the wheel to turn when the steering wheel is operated.

When the decoupling slide sleeve 210 is axially translated along the steering gear input shaft 111 and the gear shaft 105 until the first claw teeth disengaged from the second claw teeth, the steering gear input shaft 111 and the gear shaft 105 are decoupled and the vehicle enters a game mode. When the steering wheel rotates, the steering wheel drives the steering gear input shaft 111 to rotate, but the gear shaft 105 is not driven to rotate by the steering gear input shaft 111 because the gear shaft is decoupled from the steering gear input shaft 111. As a result, a turning torque of the steering wheel is not transmitted to the wheel to drive the wheel steering, thereby reducing the wear and tear of the wheel and tire.

The decoupling mechanism 2 in the embodiment of the present disclosure uses a tooth-embedded clutch structure. However, other rigid clutches can be used instead, or an electromagnetic clutch can be used to directly drive the electromagnet to achieve decoupling. The advantage is that the first power element 201 can be eliminated, but the cost may be increased. Details are not described herein. The user can choose the decoupling mechanism according to an actual demand.

In some embodiments, the decoupling mechanism 2 further includes a drive transmission mechanism configured to drive the decoupling slide sleeve 210 to translate in the axial directions of the steering gear input shaft 111 and the gear shaft 105 to be engaged with/disengaged from the lower section of the decoupling shaft 211.

The drive transmission mechanism includes a first power element 201 and a transmission reversing component. The first power element 201 is configured to provide a driving force, where the first power element 201 may be a first motor. The transmission reversing component is configured to convert a rotary driving force outputted by the first power element 201 into the axial translation of the decoupling slide sleeve 210.

In an embodiment, the transmission reversing component includes a lead screw 204 connected to an output shaft of the first power element 201 for the synchronous rotation and a shifting fork 206 threaded to the lead screw 204. The shifting fork 206 is a nut shifting fork, which engages with the lead screw 204 as a lead screw-nut pair, converting the rotational motion of the first power element 201 into the axial translational motion of the shifting fork 206. The decoupling slide sleeve 210 is embedded in a shifting fork end of the shifting fork 206, so that the decoupling slide sleeve 210 rotates synchronously with the steering gear input shaft 111 and axially translates along the steering gear input shaft 111.

An axial direction of the lead screw 204 is parallel to an axial direction of the steering gear input shaft 111 and the gear shaft 105. The first motor can be connected to a controller. The controller may be a microcontroller or a programmable logic controller, and the like. The controller can receive a decoupling signal or a coupling signal and control the first motor according to the decoupling signal or the coupling signal to be energized to rotate. When the first motor is energized to rotate, the lead screw 204 rotates in synchronization with the first motor, and drives the shifting fork 206 to translate in the axial direction of the lead screw 204. When the shifting fork 206 is axially translated, the decoupling slide sleeve 210 is driven to be translated axially to engage or disengage with the decoupling shaft 211, thereby coupling or decoupling the steering gear input shaft 111 and the gear shaft 105.

The transmission reversing component in the embodiment of the present application is the lead screw-nut pair. Certainly, a worm-gear pair or a rack-pinion pair can also be used, as long as the rotary motion of the motor can be transformed into the linear motion required by the decoupling slide sleeve 210 in the present disclosure, which is not limited herein.

In order to realize the synchronous rotation of the decoupling slide sleeve 210 with the steering gear input shaft 111 and the translation in the axial direction of the steering gear input shaft 111, a decoupling bearing 207 is coaxially arranged/disposed on an outer side of the decoupling slide sleeve 210. A driving block 205 is fixed to an outer ring of the decoupling bearing 207. The driving block 205 is arranged/disposed on the shifting fork 206, the transmission reversing component is configured to drive the decoupling slide sleeve 210 into the axial translation.

The drive transmission mechanism needs to be electrically connected to a control device and does not rotate with the rotation of the decoupling slide sleeve 210. Therefore, when the decoupling slide sleeve 210 rotates synchronously with the steering gear input shaft 111, only the inner ring of the decoupling bearing 207 rotates with the decoupling slide sleeve 210, but the outer ring of decoupling bearing 207 is not affected or does not rotate. Since the drive transmission mechanism is connected with the outer ring of the decoupling bearing 207, the drive transmission mechanism is not affected by the rotation of the decoupling slide sleeve 210. That is to say, due to the configuration of the decoupling bearing 207, the axial rotation of the decoupling slide sleeve 210 is not transmitted to the drive transmission mechanism, thereby preventing the decoupling slide sleeve 210 from driving a drive component to rotate.

In this way, the drive transmission mechanism may drive the decoupling slide sleeve 210 axially translating along the steering gear input shaft 111 by driving the decoupling bearing 207 axially translating along the steering gear input shaft 111, to engage or disengage the decoupling slide sleeve 210 with the uncoupling shaft 211. In this way, the coupling or decoupling between the steering gear input shaft 111 and the gear shaft 105 is realized.

In order to achieve relative positioning of the decoupling bearing 207 and the decoupling slide sleeve 210, one side (e.g., a first side) of an inner ring of the decoupling bearing 207 abuts against a shaft shoulder of the decoupling slide sleeve 210, the other side (e.g., a second side) of the inner ring of the decoupling bearing is axially limited though a third retainer ring 209, one side (e.g., a first side) of an outer ring of the decoupling bearing 207 abuts against a shaft shoulder of the driving block 205, and the other side (e.g., a second side) of the outer ring of the decoupling bearing is axially limited through a second retainer ring 208, so that the decoupling slide sleeve 210 can not only synchronously rotate with the steering gear input shaft 111, but also axially translate along the steering gear input shaft 111.

In an embodiment, the steering gear body 1 further includes a housing, and the lower section of the steering gear input shaft 111 and the gear shaft 105 are axially rotatably mounted in the housing. The housing includes a lower housing 101 fixed to a subframe and an upper housing 102 arranged on the lower housing 101.

A rack 103 is relatively translational in the lower housing 101 through the sliding bearings on left and right sides. The gear shaft 105 engages with the rack 103 to transmit the steering force. A lower section of the gear shaft 105 is engaged with the lower housing 101 through a second needle bearing 104. A middle section of the gear shaft 105 is engaged with the lower housing 101 through a first bearing 106. The first bearing 106 is mounted in the lower housing 101. An outer ring of the first bearing 106 is axially positioned through a second locking nut 107. One side of the inner ring of the first bearing 106 is connected to a shaft shoulder of the gear shaft 105, and the other side is positioned axially through a third locking nut 108, so as to realize the positioning of the gear shaft 105.

An upper section of the steering gear input shaft 111 is adapted to be engaged with the upper housing 102 through a second bearing 112. The second bearing 112 is mounted in the upper housing 102. An outer ring of the second bearing 112 is axially positioned through a first retainer ring 113. One side of the inner ring is connected to the shaft shoulder of the upper section of the steering gear input shaft 111, and the other side of the inner ring is axially positioned through a first snap ring 114, so as to realize the positioning of the steering gear input shaft 111. An oil seal 115 is press-fitted to the upper housing 102, and an inner ring of the oil seal 115 engages with the steering gear input shaft 111 to achieve a sealing function of an upper terminal.

In order to facilitate installation of the drive transmission mechanism, the first power element 201 is mounted to the upper housing 102 through a first bolt 203, and a sealing end cover 202 is fixed with the upper housing 102 and the lower housing 101, respectively. This design structure is adopted mainly for the convenience of the assembly. In order to realize the connection between the shifting fork 206 and the decoupling slide sleeve 210, an opening is provided on the upper housing 102, and the opening is configured to cause the shifting fork 206 to connect the decoupling slide sleeve 210 and cause the shifting fork 206 to axially translate at the opening.

After the decoupling gear shaft 105 and the steering gear input shaft 111 are decoupled through the decoupling mechanism 2, the automobile enters the game mode. However, in the game mode, the user is not subjected to resistance when operating the steering wheel, which may affect the operation feeling of the steering wheel and degrade the entertainment experience of the user.

In order to solve this technical problem, the steering system provided in the present disclosure further includes a feeling feedback mechanism 3. The feeling feedback mechanism 3 is configured to apply a feedback torque to the steering gear input shaft 111 when the gear shaft 105 and steering gear input shaft 111 are decoupled, to improve an operation feeling of a steering wheel drivingly connected to the steering gear input shaft 111, to enhance the user experience when operating the vehicle steering wheel for the entertainment, and to improve the authenticity of a vehicle game simulation.

A structure of feeling feedback mechanism 3 may be various. In an embodiment of the present disclosure, the feeling feedback mechanism 3 includes a second power element 301 and a transmission mechanism. The second power element 301 is configured to provide the driving force. The second power element 301 described here may be a second motor. The transmission mechanism is configured to transmit the driving force to the steering gear input shaft 111 to apply a reverse feedback torque to the steering gear input shaft 111.

In an embodiment, the second power element 301 is fixed and mounted to the upper housing 102 through a support 302 and a first screw 303. The transmission mechanism includes a driving pulley 305 connected to an output shaft of the second power element 301 for synchronous rotation. The driving pulley 305 is connected to a driven pulley 306 through a belt 304 to transmit the power. The driven pulley 306 is connected to the steering gear input shaft 111 through a driven pulley bearing 307 and is arranged/disposed above the decoupling slide sleeve 210. The driven pulley 306 is configured to engage with the decoupling slide sleeve 210.

A belt retaining ring 308 is arranged/disposed on one side of the driven pulley 306 close to the decoupling slide sleeve 210. One side (e.g., a first side) of the outer ring of the driven pulley bearing 307 abuts against a shaft shoulder of the driven pulley 306. The other side (e.g., a second side) of the outer ring of the driven pulley bearing is axially limited by a fourth retainer ring 309. One side (e.g., a first side) of an inner ring of the driven pulley bearing 307 abuts against a shaft shoulder of the steering gear input shaft 111. Then other side (e.g., a second side) of the inner ring of the driven pulley bearing is axially limited by a second snap ring 310. Therefore, the relative positioning of the driven pulley 306 and the steering gear input shaft 111 is realized.

When a steering decoupling function is performed, the decoupling slide sleeve 210 is axially translated away from the decoupling shaft 211 until the decoupling slide sleeve is disengaged from the lower section of the decoupling shaft 211. In this case, the steering gear input shaft 111 is decoupled from the gear shaft 105. The decoupling slide sleeve 210 and the driven pulley 306 both have mutually compatible triangular claw teeth, where the compatible triangular claw teeth are engaged. The torque feedback of the second motor is transmitted to the driven pulley 306 through the engagement of the driving pulley 305 with the belt 304. The driven pulley 306 transmits the torque to the decoupling slide sleeve 210 by engaging the triangular claw teeth. The decoupling slide sleeve 210 is splined to the steering gear input shaft 111 to simulate the road feedback on a steering wheel terminal.

In some embodiments, the feeling feedback mechanism 3 may further include a torque sensor. The torque sensor is configured to detect a torsional torque of the steering gear input shaft 111 in a decoupling state. The controller may control an input current of the second motor according to the magnitude of the detected torsional torque, thereby changing a driving force outputted by the second motor.

In the embodiment of the present disclosure, a belt wheel is used as the feeling feedback mechanism 3 for the torque transmission, or single-stage or multi-stage gear drive may be used for the torque transmission, or a worm gear is used for the transmission at a large reduction ratio to reduce the requirement for the performance of the motor.

In an embodiment of the present disclosure, the steering system may further include a limiting mechanism 4. The limiting mechanism 4 not only may limit a range of steering angle of the steering gear input shaft 111 when the steering gear input shaft 111 is coupled to the gear shaft 105, but also may limit the range of steering angle of the steering gear input shaft 111 when the steering gear input shaft 111 is decoupled from the gear shaft 105.

Figures 7, 8:
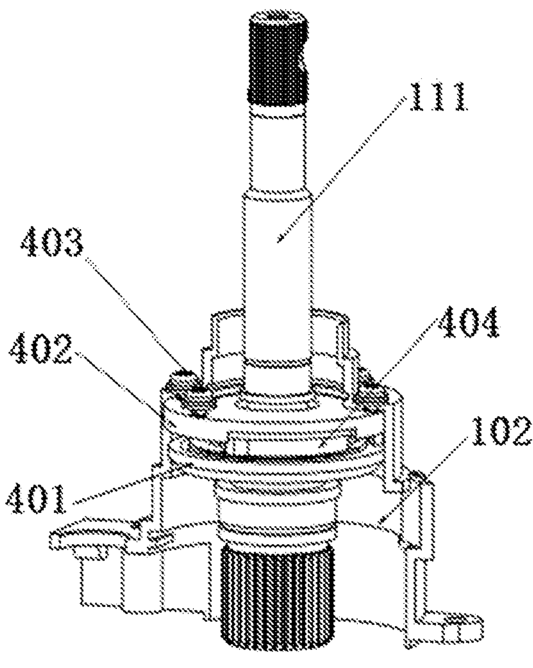
FIG. 7 is a first schematic structural diagram of a limiting mechanism according to the present disclosure.
FIG. 8 is a second schematic structural diagram of a limiting mechanism according to the present disclosure.
Figures 9, 10, 11:
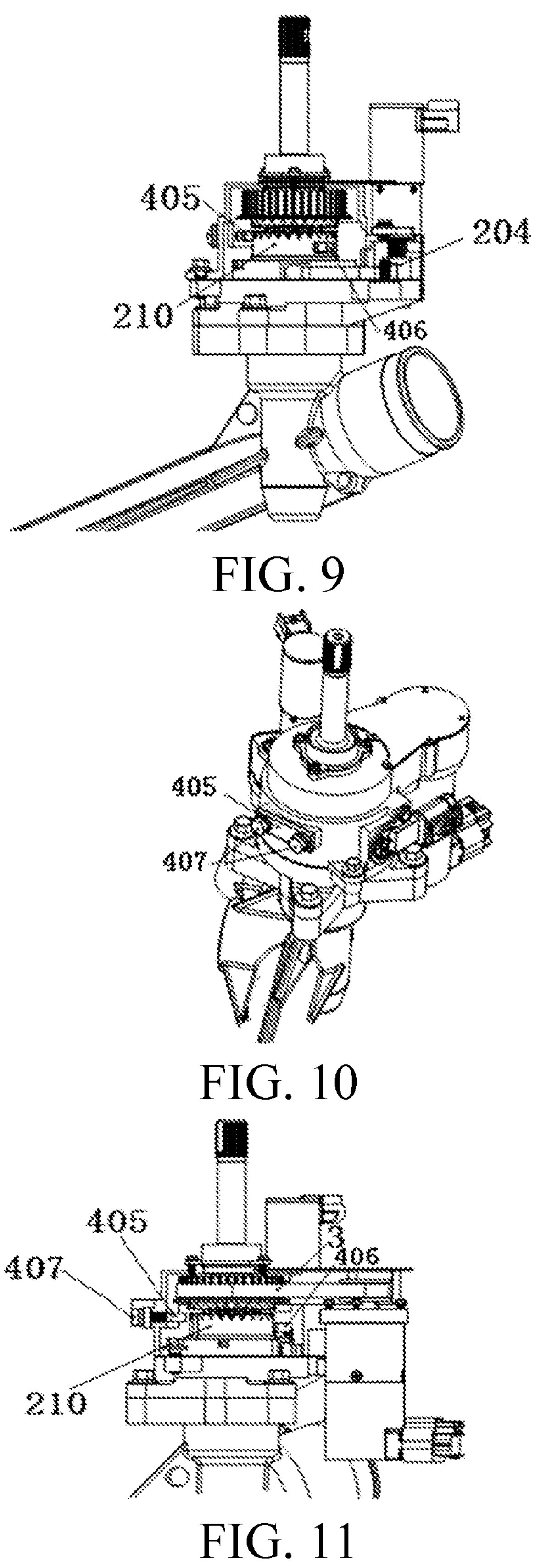
FIG. 9 is a third schematic structural diagram of a limiting mechanism according to the present disclosure.
FIG. 10 is a fourth schematic structural diagram of a limiting mechanism according to the present disclosure.
FIG. 11 is a fifth schematic structural diagram of a limiting mechanism according to the present disclosure.

In an embodiment, as shown in FIG. 7 and FIG. 8, the limiting mechanism 4 is arranged/disposed above the decoupling slide sleeve 210. The limiting mechanism 4 includes a limiting disc 401 and a limiting guide rail 402 sleeved on the steering gear input shaft 111. The limiting disc 401 is configured to rotate with the steering gear input shaft 111. A spiral groove is formed on the limiting disc 401, and a limiting block is arranged/disposed on the limiting disc 401. The limiting guide rail 402 is fixed and mounted to the upper housing 102 through a second screw 403, and a limiting slider 404 is slidably arranged/disposed in the limiting guide rail 402. The limiting slider 404 includes a guide pin inserted into the spiral groove, and can slide freely in the direction of the guide rail. Pre-tightening and anti-abrasion are performed through an elastic coating in the axial direction. A limiting boss matching the limiting block is further arranged/disposed on the limiting slider 404.

After the gear shaft 105 and the steering gear input shaft 111 are decoupled, the automobile enters the game mode. When the steering wheel rotates, the steering gear input shaft 111 rotates accordingly, driving the limiting disc 401 to rotate. The limiting disc 401 includes an internal spiral groove that generate a thrust to a guide pin of the limiting slider 404 along the direction of the guide rail when rotating. When the number of rotations reaches a design limit, the limiting slider 404 moves along the guide rail to a position where the limiting block on the limiting disc 401 abuts against the limiting boss on the limiting slider 404. In this case, the steering wheel cannot continue to rotate under the torque allowed by the structural strength, so as to realize the steering limiting function. In this way, the user experience is improved and a clock spring is protected.

The limiting mechanism 4 described in the embodiment of the present disclosure is not limited to the use of the structure described in this embodiment. This embodiment may be limited by an arrangement space. The structure such as a deceleration structure with less tooth difference and a nut lead screw limit can also be used, which can pass a strength check on a premise that the arrangement space is satisfied.

In an embodiment of the present disclosure, the steering system may further include a limiting mechanism 4. The limiting mechanism 4 can limit a range of steering angle of the steering gear input shaft 111 when the steering gear input shaft 111 and the gear shaft 105 are in the decoupling state.

In the related art, the steering system is generally set with a maximum number of turns. On the one hand, it is based on the feel of the steering operation, and on the other hand, it is to avoid the frictional collision with a surrounding part caused by an excessive wheel steering angle. A common limit mode of the steering gear on the market is usually to limit the movement space of the rack and reach the limit of the steering wheel rotation. The steering rack of a common mechanical steering gear is threaded to a sphere-pin sleeve, and the sphere-pin sleeve is engaged with a ball head pull rod to transfer the steering force to the wheel. When the rack reaches the limit, an end surface of the sphere-pin sleeve contacts the housing and prevents the rack from moving further, thereby limiting the steering angle.

However, after the decoupling mechanism 2 realizes the decoupling of the steering gear input shaft 111 and the gear shaft 105, the rack limiting structure no longer limit the angle of the steering wheel when a power transmission path is disconnected from the rack. In this case, a clock spring assembly inside the steering wheel can be damaged by the turning over the limit, disabling many of the electronic buttons on the steering wheel.

In order to resolve the foregoing technical problems, the steering system of the present disclosure further includes a limiting mechanism 4 configured to limit a range of rotation angle of the steering gear input shaft 111 when the gear shaft 105 and the steering gear input shaft 111 are decoupled, to avoid a damage of components such as the clock spring caused by the excessive steering angle of the driver as steering to a decoupling operating condition.

As shown in FIG. 9 to FIG. 15, the limiting mechanism 4 is mounted to the decoupling mechanism 2 in this embodiment. The limiting mechanism 4 can ensure that the steering angle of the steering wheel is limited after the steering system is decoupled, avoiding a risk of the damage to the component such as the clock spring after the steering system is decoupled. At the same time, the limiting mechanism is designed based on the function of steering decoupling, which has a high space utilization rate and does not affect the steering limit in a normal running procedure.

The limiting mechanism 4 includes a first limiting pin 405 arranged/disposed in the housing and a second limiting pin 406 arranged/disposed on the decoupling slide sleeve 210. The second limiting pin 406 abuts against the first limiting pin 405 to stop the steering gear input shaft 111 when the steering gear input shaft 111 is rotated to a limit position.

The first limiting pin 405 is mounted in the housing and is locked by a second bolt 407. The second limiting pin 406 is arranged/disposed on the decoupling slide sleeve 210, rotates with the decoupling slide sleeve 210, and engages with the first limiting pin 405 after the decoupling to realize the angle limit function.

The decoupling function of the decoupling mechanism 2 in the present disclosure is realized through the lead screw-nut pair. In an embodiment, when the lead screw 204 that is coaxial with an output shaft of the first motor rotates, the shifting fork 206 makes a linear movement on the lead screw 204, since a degree of freedom of the shifting fork 206 and the lead screw 204 is limited. In this case, the shifting fork 206 drives the driving block 205 to engage with the decoupling bearing 207 and to drive the decoupling slide sleeve 210 to translate axially. The decoupling slide sleeve 210 disengages from the decoupling shaft 211 and couples with the feeling feedback mechanism 3 when the decoupling slide sleeve moves up. Since the second limiting pin 406 is arranged/disposed on the decoupling slide sleeve 210, the second limiting pin 406 and the first limiting pin 405 also form a decoupling relationship. When the steering system is in the decoupling state, the second limiting pin 406 is at the same level as the first limiting pin 405, and serves the function of limiting the steering angle.

Figure 12:
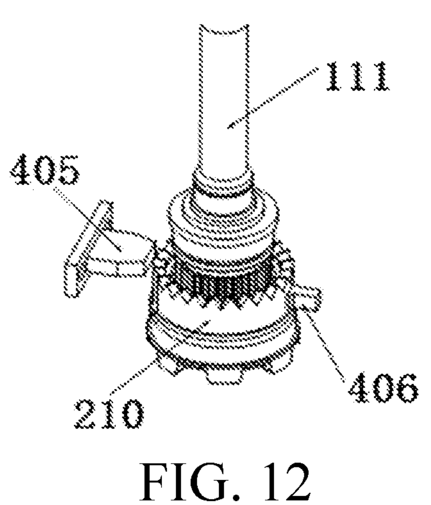
FIG. 12 is a first schematic structural diagram of a limiting mechanism in a decoupling state.
Figure 13:
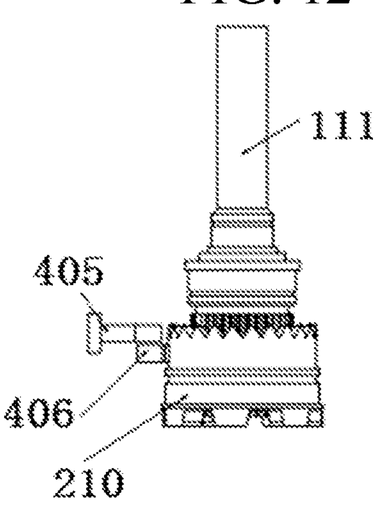
FIG. 13 is a second schematic structural diagram of a limiting mechanism in a decoupling state.

As shown in FIG. 12 and FIG. 13, when the gear shaft 105 and the steering gear input shaft 111 are coupled, that is, when the decoupling slide sleeve 210 is located at a bottom dead center, the limiting mechanism 4 is in the decoupling state, that is, the second limiting pin 406 and the first limiting pin 405 are not in a same horizontal plane. In this case, the decoupling slide sleeve 210 can rotate freely with the steering gear input shaft 111, and the angle limitation can be realized by the rack of the steering gear.

Figure 14:
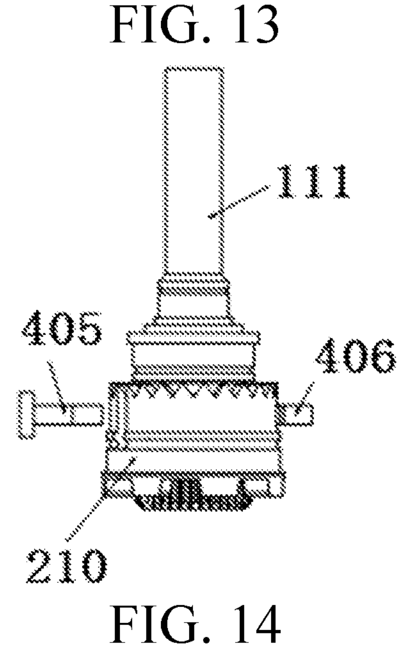
FIG. 14 is a schematic structural diagram of a limiting mechanism in a coupling state.
Figure 15:
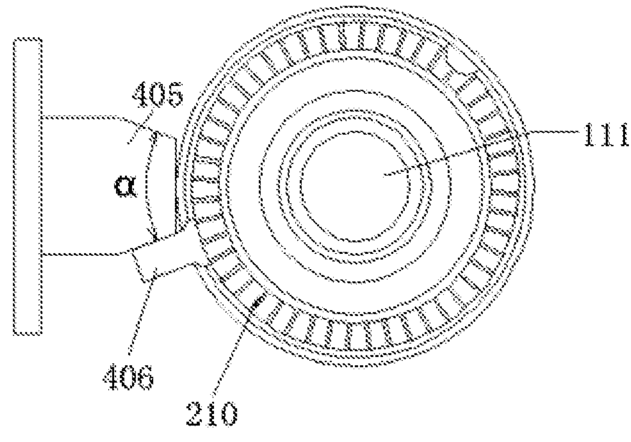
FIG. 15 is a top view of a limiting mechanism in a coupling state.

As shown in FIG. 14 and FIG. 15, when the gear shaft 105 and the steering gear input shaft 111 are decoupled, that is, the decoupling slide sleeve 210 is at a top dead center. In this case, the limiting mechanism 4 is in the coupling state, that is, the second limiting pin 406 and the first limiting pin 405 are in the same horizontal plane. When the steering gear input shaft 111 rotates, the decoupling slide sleeve 210 rotates accordingly, and simultaneously drives the second limiting pin 406 to rotate. When a corner of a steering wheel end reaches a design goal of (360−α)/2 degrees, the second limiting pin 406 abuts against the first limiting pin 405 to stop the steering gear input shaft 111, and the decoupling slide sleeve 210 cannot continue to rotate, so as to achieve the function of limiting the steering angle.

The limiting mechanism 4 in this embodiment has the advantages of a simple structure and a high reliability, and does not affect the steering limit during the normal driving through the decoupling function, which improves the system fault tolerance. In addition, no axial space is increased in the axial direction, and the assembly is simple.

This embodiment does not limit shapes of the first limiting pin 405 and the second limiting pin 406. The first limiting pin and the second limiting pin are not limited to pins with rectangular sections in the figure, but may also be machined into shaped pins with better load bearing conditions. Moreover, in the present disclosure, a limiting angle α is not limited and is set according to the requirement for the steering angle of the game steering wheel during the actual steering decoupling. Two side walls of the first limiting pin 405 may be machined into inclined planes as shown in FIG. 12 or FIG. 15. Certainly, the second limiting pin 406 may also be machined into the inclined plane, as long as a contact area is enough and the strength meets the demand.

It should be noted that the limiting mechanism 4 plays a limiting role when the steering gear input shaft 111 and the gear shaft 105 are in the decoupling state. When the steering wheel is not decoupled and the vehicle is in the normal driving state, the limiting mechanism 4 does not limit the steering wheel, and the limit position of the steering wheel of the vehicle is limited by the limiting system. Details are not described herein again.

Figure 16:
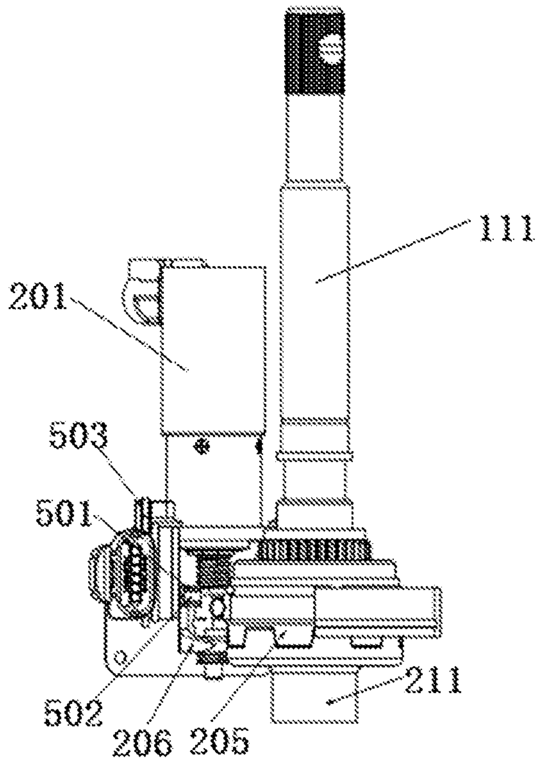
FIG. 16 is a first schematic structural diagram of a state detection mechanism according to the present disclosure.
Figure 17:
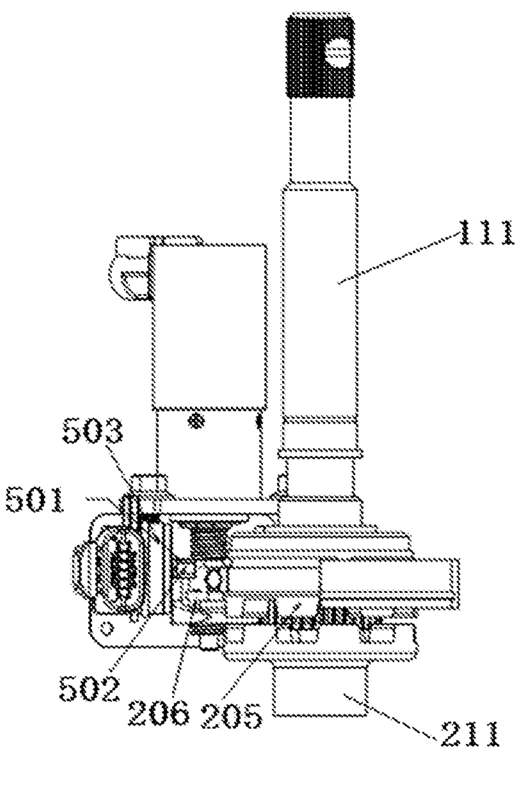
FIG. 17 is a second schematic structural diagram of a state detection mechanism according to the present disclosure.

As shown in FIG. 16 and FIG. 17, the steering system further includes a state detection mechanism configured to detect a decoupling state or a coupling state of the gear shaft 105 and the steering gear input shaft 111. The state detection mechanism determines whether the steering system is reliably coupled by detecting the position of the decoupling slide sleeve 210. A state input is provided for the decoupling function of a game vehicle system to ensure that the whole vehicle can respond in a timely manner when abnormal uncoupling occurs, such as stopping the vehicle and other troubleshooting means to improve the safety of the vehicle.

The state detection mechanism includes a Hall sensor 503 and a magnetic steel 502. The Hall sensor 503 is fastened to the upper housing 102 through the bolts and sealed by an O-ring. The magnetic steel 502 is arranged in a gap between the press-fit steel sleeve 501 and the shifting fork 206 to ensure consistency with the movement of the shifting fork 206.

The magnetic steel 502 is embedded in the press-fit steel sleeve 501 and is arranged/disposed on the shifting fork 206 to ensure that the movement of the magnetic steel 502 is consistent with the decoupling slide sleeve 210. The assembly method is mainly taken into consideration that a relative position relationship between the shifting fork 206 and the Hall sensor 503 is different due to the limitation of the arrangement space when a different model is applied. In order to ensure the universality of the shifting fork 206, the magnetic steel 502 is assembled in post-press-fit. That is, the shifting fork 206 can ensure the universality of a mold by post-processing a press-fit groove.

The Hall Sensor 503 can detect the position of the magnetic steel 502. As shown in FIG. 17, when the decoupling slide sleeve 210 is located at the bottom dead center, the decoupling slide sleeve 210 engages the lower section of the decoupling shaft 211 and is pressed by the shifting fork 206. In this case, the Hall Sensor 503 transmits the coupling state to the system controller and the whole vehicle related module.

As shown in FIG. 18, when the shifting fork 206 is driven by the second motor, the decoupling slide sleeve 210 is upwardly decoupled from the decoupling shaft 211, and the steering system is in the decoupling state. In this case, the magnetic steel 502 is located in the top dead center, the Hall Sensor 503 transmits the decoupling state to the system controller and the whole vehicle related modules.

The state detection mechanism described in the present disclosure is not limited to the use of the Hall principle, but can also be the principle of contact measurement, as long as the mechanism can detect the position of the decoupling slide sleeve 210.

It should be noted that the feeling feedback mechanism 3 can be canceled when using the state detection mechanism described in this embodiment. The steering system is adapted to a vehicle with a C-EPS (Electric Power Steering), and the driving feel is fed back through the C-EPS motor. Therefore, the feeling feedback mechanism 3 inside the steering system is canceled from the perspective of cost, which can save a considerable hardware cost and reduce a development cost of the decoupled steering controller by adjusting a C-EPS program to develop the feel of the game.

Moreover, based on the steering system provided in the first aspect of the embodiment of the present disclosure, a second aspect of the embodiment of the present disclosure provides a vehicle. The vehicle includes the steering system according to the first aspect of the embodiment of the present disclosure.

The foregoing are only embodiments of the present application and are not to limit the present disclosure in any way. Although the present disclosure has been described with reference to the above embodiments, the embodiments are not to limit the present disclosure. Any person skilled in the art of this patent may use the technical content suggested above to make some changes or modifications to equivalent embodiments within the scope of the technical solution of present disclosure, but any simple modifications, equivalent changes and modifications to the above embodiments based on the technical substance of present disclosure, without departing from the technical solution of present disclosure, are still within the scope of present disclosure.

What is claimed is:

1. A steering system, comprising:

a steering gear body, wherein the steering gear body comprises a steering gear input shaft and a gear shaft;

a decoupling mechanism, wherein; the decoupling mechanism is configured to decouple the steering gear input shaft from the gear shaft or couple the steering gear input shaft to the gear shaft; the decoupling mechanism comprises a decoupling slide sleeve, a decoupling shaft, and a drive transmission mechanism; the drive transmission mechanism is configured to drive the decoupling slide sleeve to translate in an axial direction of the steering gear input shaft and an axial direction of the gear shaft to be engaged with or disengaged from the decoupling shaft; and the drive transmission mechanism comprises a first power element configured to provide a driving force, and a transmission reversing component configured to convert a rotary driving force outputted by the first power element into axial translation of the decoupling slide sleeve; and a limiting mechanism, wherein the limiting mechanism is configured to limit a range of a steering angle of the steering gear input shaft in response to that the steering gear input shaft is decoupled from the gear shaft or that the steering gear input shaft is coupled to the gear shaft.

2. The steering system according to claim 1, wherein
the steering gear input shaft is disposed coaxially with the gear shaft; and
the decoupling slide sleeve is sleeved on one of the steering gear input shaft and the gear shaft, and the decoupling shaft is disposed on the other one of the steering gear input shaft and the gear shaft.

3. The steering system according to claim 2, wherein
the steering gear input shaft comprises a hollow structure of a lower section of the steering gear input shaft, and an upper section of the gear shaft extends into the hollow structure;
the decoupling slide sleeve is splined to the lower section of the steering gear input shaft;
a lower section of the decoupling shaft is splined to the upper section of the gear shaft and is locked to the upper section of the gear shaft through a first locking nut;
the decoupling slide sleeve comprises a first claw teeth, and the decoupling shaft comprises a second claw teeth; and
the decoupling slide sleeve is configured to translate in the axial direction of the steering gear input shaft and the axial direction of the gear shaft, to cause the first claw teeth to be engaged with or disengaged from the second claw teeth, and to couple the steering gear input shaft to the gear shaft or decouple the steering gear input shaft from the gear shaft.

4. The steering system according to claim 3, wherein the upper section of the gear shaft is disposed in the hollow structure of the lower section of the steering gear input shaft through a first needle bearing.

5. The steering system according to claim 4, wherein the steering gear body further comprises a housing; and the lower section of the steering gear input shaft and the gear shaft are rotatably mounted in the housing.

6. The steering system according to claim 1, wherein the transmission reversing component comprises a lead screw connected with an output shaft of the first power element and a shifting fork threaded with the lead screw; and the decoupling slide sleeve is embedded at a shifting fork end of the shifting fork to cause the decoupling slide sleeve to rotate with the steering gear input shaft and to translate in the axial direction of the steering gear input shaft.

7. The steering system according to claim 6, wherein
a decoupling bearing is coaxially disposed on an outer side of the decoupling slide sleeve, a driving block is connected to an outer ring of the decoupling bearing, and the driving block is disposed on the shifting fork; and
the transmission reversing component is configured to drive the decoupling slide sleeve to axially translate.

8. The steering system according to claim 7, wherein a first side of an inner ring of the decoupling bearing abuts against a shaft shoulder of the decoupling slide sleeve; a second side of the inner ring of the decoupling bearing is limited though a third retainer ring; a first side of the outer ring of the decoupling bearing abuts against a shaft shoulder of the driving block; and a second side of the outer ring of the decoupling bearing is limited through a second retainer ring.

9. The steering system according to claim 6, wherein the first power element is fixed on a housing of the steering gear body; the housing comprises an opening; and the shifting fork is connected to the decoupling slide sleeve through the opening and axially translational at the opening.

10. The steering system according to claim 1, further comprising a feeling feedback mechanism, wherein the feeling feedback mechanism is configured to apply a feedback torque to the steering gear input shaft during decoupling of the steering gear input shaft from the gear shaft.

11. The steering system according to claim 10, wherein the feeling feedback mechanism comprises:
a second power element, configured to provide a first driving force; and
a first transmission mechanism, configured to transmit the first driving force to the steering gear input shaft to apply a reversed feedback torque to the steering gear input shaft.

12. The steering system according to claim 11, wherein the first transmission mechanism comprises a driving pulley connected with an output shaft of the second power element for synchronous rotation; a driven pulley is connected with the driving pulley through a belt; the driven pulley is connected with the steering gear input shaft through a driven pulley bearing; and the driven pulley is configured to engage with or disengage from the decoupling slide sleeve.

13. The steering system according to claim 12, wherein a belt retaining ring is disposed on a side of the driven pulley close to the decoupling slide sleeve.

14. The steering system according to claim 12, wherein a first side of an outer ring of the driven pulley bearing abuts against a shaft shoulder of the driven pulley; a second side of the outer ring of the driven pulley bearing is limited by a fourth retainer ring; a first side of an inner ring of the driven pulley bearing abuts against a shaft shoulder of the steering gear input shaft; and a second side of the inner ring of the driven pulley bearing is limited by a second snap ring.

15. The steering system according to claim 11, wherein the second power element is fixed to a housing of the steering gear body through a support.

16. The steering system according to claim 9, wherein
the limiting mechanism comprises a limiting disc and a limiting guide rail sleeved on the steering gear input shaft;
the limiting disc is configured to rotate with the steering gear input shaft, the limiting disc comprises a spiral groove and a limiting block disposed on the limiting disc; and
the limiting guide rail is fixed to the housing, a limiting slider is disposed in the limiting guide rail, and the limiting slider comprises a guide pin inserted into the spiral groove and a limiting boss matching the limiting block.

17. The steering system according to claim 9, wherein the limiting mechanism comprises a first limiting pin disposed in the housing and a second limiting pin disposed on the decoupling slide sleeve; and the second limiting pin abuts against the first limiting pin to stop the steering gear input shaft when the steering gear input shaft rotates to a limit position.

18. The steering system according to claim 9, further comprising a state detection mechanism configured to detect a decoupling state or a coupling state of the gear shaft and the steering gear input shaft.

19. The steering system according to claim 18, wherein the state detection mechanism comprises a Hall sensor and magnetic steel; the Hall sensor is disposed on the housing; a press-fit steel sleeve is disposed on the shifting fork; and the magnetic steel is disposed in a gap between the press-fit steel sleeve and the shifting fork.

20. A vehicle, comprising a steering system comprising:

a steering gear body, wherein the steering gear body comprises a steering gear input shaft and a gear shaft;

a decoupling mechanism, wherein; the decoupling mechanism is configured to decouple the steering gear input shaft from the gear shaft or couple the steering gear input shaft to the gear shaft; the decoupling mechanism comprises a decoupling slide sleeve, a decoupling shaft, and a drive transmission mechanism; the drive transmission mechanism is configured to drive the decoupling slide sleeve to translate in an axial direction of the steering gear input shaft and an axial direction of the gear shaft to be engaged with or disengaged from the decoupling shaft; and the drive transmission mechanism comprises a first power element configured to provide a driving force, and a transmission reversing component configured to convert a rotary driving force outputted by the first power element into axial translation of the decoupling slide sleeve; and a limiting mechanism, wherein the limiting mechanism is configured to limit a range of a steering angle of the steering gear input shaft, in response to that the steering gear input shaft is decoupled from the gear shaft or that the steering gear input shaft is coupled to the gear shaft.

* * * * *